United States Patent Office 3,266,288
Patented August 16, 1966

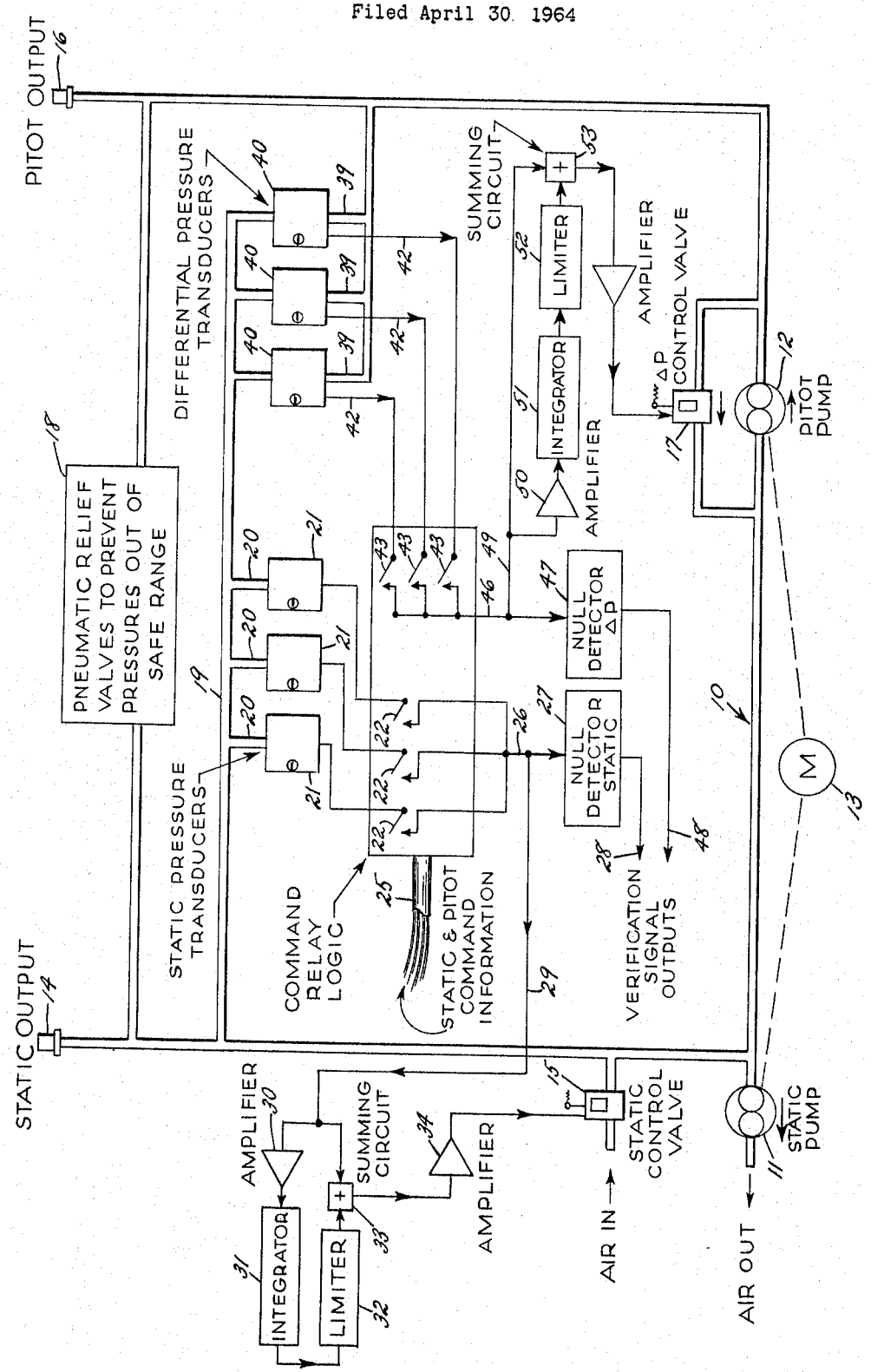

3,266,288
AUTOMATIC PRESSURE GENERATING AND REGULATING SYSTEM
John H. Andresen, Jr., Hewitt, N.J., and James Albert Fitzpatrick, Bayside, N.Y., assignors to Intercontinental Dynamics Corporation, Englewood, N.J.
Filed Apr. 30, 1964, Ser. No. 363,904
3 Claims. (Cl. 73—4)

This invention relates generally to the field of pressure generating systems for use in testing aircraft instruments sensitive to static and pitot pressures. Devices of this general type are known in the art, and the invention herein lies in specific constructional improvements permitting more rapid and accurate testing procedures.

In my prior Patent No. 3,089,331, filed jointly with Sam Sharko and Joshua Salem, and assigned to the same assignee as the instant application, there is disclosed a pitot-static tester of similar type. In devices of this character, there is normally provided a static pressure pump and a pitot pressure pump, both pumps being driven by a common motor. The static pressure is referenced to a vacuum, and an automatic valve is provided to bleed air into the system to maintain desired static pressure with reference to a vacuum. The pitot pressure is always above the static pressure, and is thus referenced to the static manifold. Static pressure is normally required in the range of .5 to 31.5 inches of mercury, absolute, and pitot pressure is higher than static pressure by an amount which may be between 0 and 90.0 inches of mercury for present day aircraft.

In the device described in the above-mentioned Patent No. 3,089,331, the desired pressures are selected by turning adjusting knobs on the absolute pressure and differential pressure controllers to obtain regulated pressures which are subsequently read-out on pressure sensing indicators, such as an altimeter and an air speed indicator. In this system, the accuracy of the generated and regulated pressure is wholly dependent upon the accuracy of the read-out indicator, and the skill of the operator in precisely reading these indicators and applying proper corrections for known calibration errors in the indicators. In such construction, an infinite number of pressures may be selected.

In the device presently disclosed, there is provided means whereby a number of discrete pressures may be supplied to pitot and static outputs in accordance with a pre-established mechanically or electrically implemented program, wherein the pressures may be precisely generated and regulated without human intercession. To accomplish this end, there is substituted for a single static controller and a single pitot controller a separate controller for each pitot and static pressure to be selected. Each controller is adjustable by a screw driver adjustment to any value over a part of the tester's full range. Because each controller need only sense pressure over a small range (possibly only one specific pressure) the controller may be compensated for error due to ambient temperature change much more closely than if it is needed to be accurate and stable over a wide adjustment range as it is the controller in the prior art system. In the prior art system precise pressure for a given controller setting is not required, since the ultimate accuracy is in the read-out indicator. In the prior art system, should the controller drift with temperature, it may be reset by the operator to give the correct desired pressure in the read-out indicator.

The prior art system is also subject to a change in output pressure not only due to calibration drift in the controller, but also due to supply voltage changes, changes in the pumping rate, changes in fluid leakage in the system, changes in amplifier gain as well as changes in the control valve with temperature. In keeping with the provision of a fully automatic system, the present system contemplates the use of a special amplifier in which the output current to the control valve is related to the error voltage as well more fully appear herein.

It is therefore among the principal objects of the present invention to provide an improved automatic pressure generating and regulating system for use in providing preselected pitot and static output pressures in accordance with a preselective program.

Another object of the invention lies in the provision of an improved automatic pressure generating and regulating system in which pressure operated instruments may be tested in accordance with an objective standard, wherein the device may be used by those possessed of only ordinary skill.

A further object of the invention lies in the provision of an improved automatic pressure generating and regulating system which in mechanical complexity may be favorably compared with existing art devices, and which may be fabricated at comparable costs.

Yet another object of the invention lies in the provision of an improved automatic pressure generating and regulating system having automatic compensating means for eliminating inaccuracies due to fluctuations in supply voltage, pumping rate, fluid leakage and similar variables, wherein mechanical adjustment is unnecessary.

A feature of the invention lies in the convenience which the predetermined selectable discrete pressures may be manually adjusted as desired.

These objects and features, as well as other incidental ends and advantages, will more fully appear in the progress of the following disclosure, and be pointed out in the appended claims.

In the drawing, to which reference will be made in the specification, the single figure is a schematic representation of an embodiment of the invention.

In accordance with the invention, the device, generally indicated by reference character 10, includes a first or static pump 11 and pitot pump 12, the pumps 11 and 12 preferably being driven by a single motor 13. The static pump 11 in conjunction with a static control valve 15 which bleeds in the required amount of ambient air, provides a regulated static pressure at an output 14. The pump 12 provides pitot pressure referenced to the static pressure at a pitot output 16 in conjunction with a corresponding pitot control valve 17 which bleeds to the static pressure. To avoid the possibility of damaging delicate instruments to which the device 10 is connected, pneumatic relief valves 18 are preferably interconnected between the pitot and static outputs, the same being coupled in the manner disclosed in the above-mentioned Patent No. 3,089,331.

Connected to a static pressure line 19 by short pressure lines 20, are a plurality of static pressure transducers 21, each connected by one of a plurality of command relays 22 which operate in selective fashion by a command information input 25 and is of the type disclosed in the above-mentioned Patent Number 3,089,331. Each of the transducers 21 is adjusted to provide an output null voltage when at a previously adjusted pressure, which voltage is transmitted along a common conductor 26. Connected to the conductor 26 is a static null detector 27 having a verification signal output 28 indicating that a preselected pressure corresponding to the adjustment on the selected transducer has been obtained. The voltage output of the individual transducer 21 is fed to an error signal conductor 29 and an amplifier circuit 30. The amplifier circuit 30 includes an integrator 31, of a type similar to that disclosed in Pulse and Digital Circuits by Millman & Taub, published by McGraw-Hill, New York City, 1956, at page 46; a limiter 32, a summing circuit 33 as well as a further amplification stage 34 for the static control valve 15. Operation of the amplifier circuit 30 is as follows:

There is a component of output current which varies proportionally with the error voltage from the transducers such that a higher pressure causes a proportionally higher current in the control valve. This causes the valve to open and bring the pressure toward the selected value. However, if this component alone were used, the valve would require a wider opening to maintain a fixed pressure if the flow rate were increased. This wider opening would require a higher current and have a longer error signal. The longer controller error signal output would represent a different pressure at equilibrium, and hence an error. Similar errors would occur as a result of changes of amplifier gain, control valves sensitivity changes or supply voltage changes.

To offset the above errors a second component of transducer current is used which increases output current as a nearly linear function of time when the pressure is the slightest amount above the selected pressure, which is the pressure at which the selected transducer is at null. In a similar manner, it decreases the current as a function of time when pressure is very slightly below the selected (null) value. This function is referred to in the serve control art as an "integral" signal. In the present system, this integral component of current is limited to a fixed minimum value which can be over-ridden by the proportional component when the pressure is more than a certain amount away from the selected value. For example, this value may be of the order of 0.5% of the total pressure range of the system. The rate at which the current increases with time is significant in obtaining proper system operation. If too short, the system will "hunt" or overshoot above and below the selected value. If too long, the system will require too long a period of time to settle at the desired value. For the present construction, a period of from two to ten seconds to reach the maximum value is preferable.

The result of this "integral" signal component is to automatically wipe out all of the above-mentioned errors by slowly bringing the control valve current to a level which holds the pressure at the correct or no output value at the selected transducer. Thus all errors due to supply voltage, flow rate, leakage, amplifier drift, and control valve changes are eliminated.

The integral signal, which is produced by the integrator 31 and limiter 32 is summed with the error signal from the selected transducer, and after a further amplification in the stage 34, the resultant current operates the static control valve 15. Upon a change of transducer 21, the system will operate to a voltage null on the new transducer, and the system rapidly adjusts itself to equilibrium at the new pressure.

The structure of the pitot portion of the system is generally similar, including a plurality of pressure lines 39, pressure transducers 40 and conductors 42, the same being selectively operated by relays 43. A common conductor 46 leads to a pitot null detector 47 having a corresponding verification signal output 48, while an error signal conductor 49 leads to an amplifier circuit 50 having an integrator 51, a limiter 52, a summing circuit 53 and a further amplification stage 54 connected to the pitot control valve 17.

We wish it to be understood that we do not consider the invention limited to the precise details of structure shown and set forth in this specification, for obvious modifications will occur to those skilled in the art to which the invention pertains.

We claim:

1. In an automatic pressure generating and regulating system for providing a pressure referenced to a vacuum, including pump means for creating a vacuum, and control valve means for bleeding air to said system to obtain desired pressures, the improvement comprising: a plurality of pressure transducers, each producing a null at a predetermined value of pressure; an amplifying circuit having a proportional and an integral output, means for selectively connecting one of said transducers to said amplifying circuit, and means for summing said outputs, connected to said control valve and the selectively actuated transducer.

2. In an automatic pressure generating and regulating system for providing a pressure referenced to a vacuum, including pump means for creating a vacuum, and control valve means for bleeding air to said system to obtain desired pressures, the improvement comprising: a plurality of pressure transducers, each producing a null at a predetermined value of pressure, an amplifying circuit having a proportional and an integral output, means for selectively connecting one of said transducers to said amplifying circuit, and means for summing said outputs, connected to said control valve and the selectively actuated transducer; and null detector means for indicating the presence of pressure of predetermined value.

3. In an automatic pressure and generating and regulating system for producing a first controlled pressure referenced to a vacuum, and a second controlled pressure referenced to said first controlled pressure, including pump means for producing said first pressure, first control valve means for bleeding air to regulate said first pressure, second pump means for producing said second pressure, second control valve means for bleeding said first pressure to said second pressure; the improvement comprising; a plurality of first and second pressure transducers each providing a current of fixed value corresponding to a predetermined pressure, amplifier means having a proportional and an integral output, and means for summing said outputs, means for selectively connecting one of said transducers to said amplifier means, said amplifier means being connected to each of said control valves.

References Cited by the Examiner

UNITED STATES PATENTS 2,422,702    6/1947    Rodant _____ 73—4 X
3,089,331    5/1963    Sharko _____ 73—4

LOUIS R. PRINCE, *Primary Examiner.*

S. C. SWISHER, *Assistant Examiner.*